June 2, 1953  R. J. HARKENRIDER  2,640,740
JOURNAL LUBRICATOR

Filed Aug. 11, 1948  5 Sheets-Sheet 1

Inventor
R. J. Harkenrider

June 2, 1953 R. J. HARKENRIDER 2,640,740
JOURNAL LUBRICATOR
Filed Aug. 11, 1948 5 Sheets-Sheet 2

Inventor
R. J. Harkenrider
By Jewett and Mead
Attorneys

June 2, 1953  R. J. HARKENRIDER  2,640,740
JOURNAL LUBRICATOR
Filed Aug. 11, 1948  5 Sheets-Sheet 3
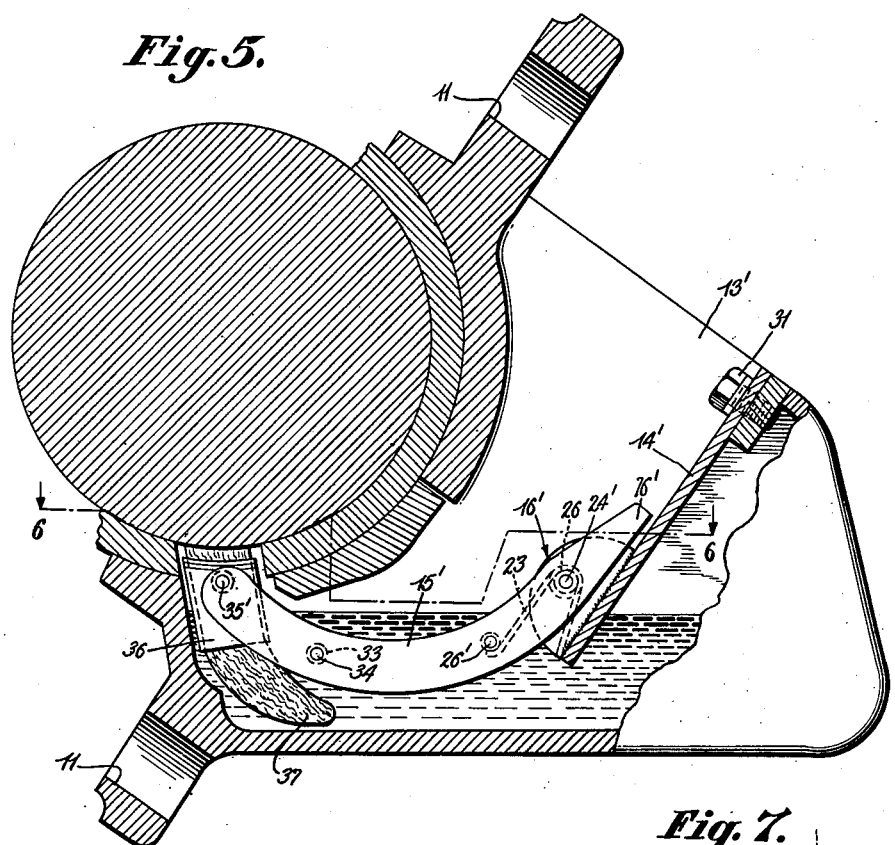
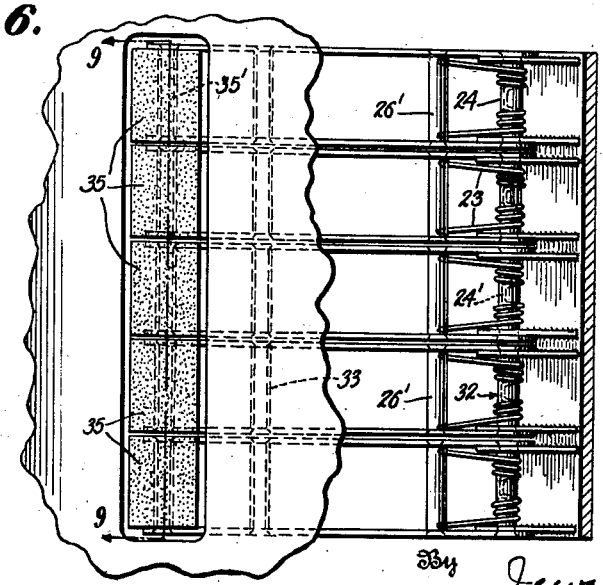
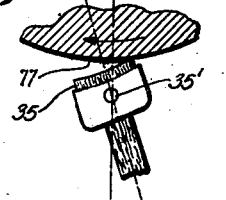
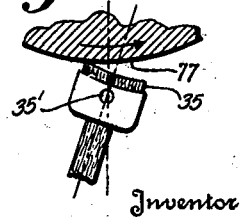
Inventor
R. J. Harkenrider
By Jewett, Mead & Browne
Attorneys

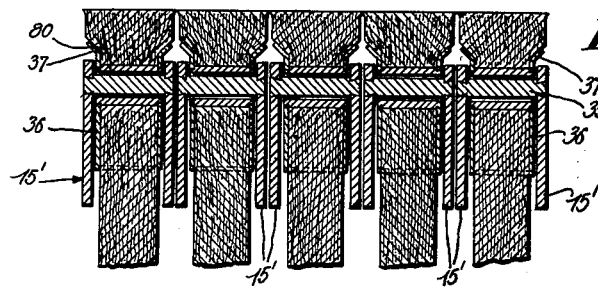
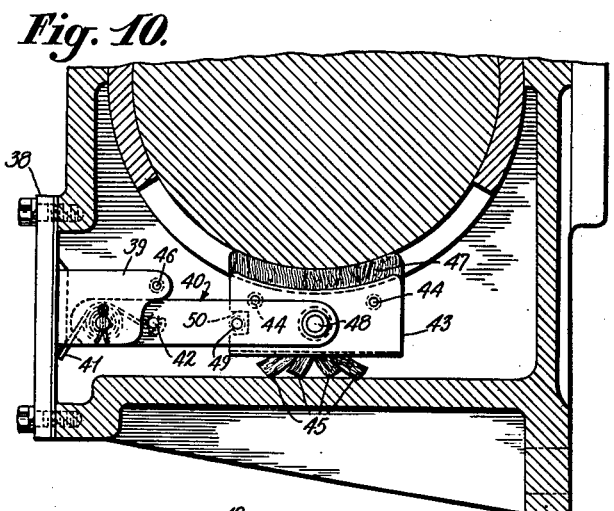
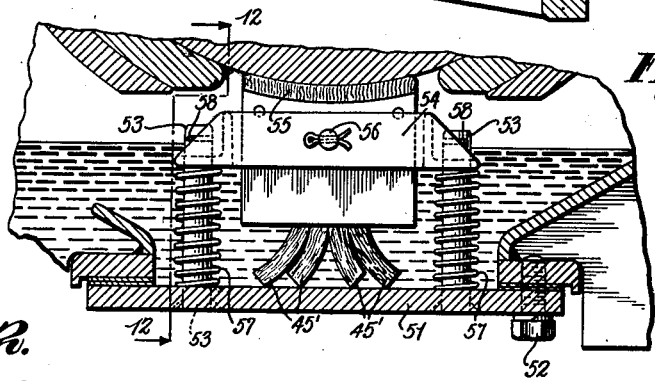
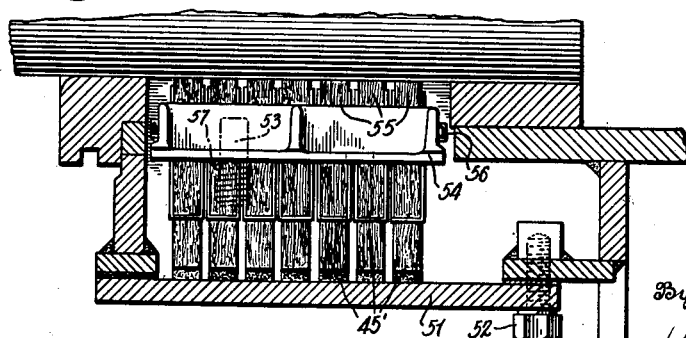

June 2, 1953     R. J. HARKENRIDER     2,640,740
JOURNAL LUBRICATOR
Filed Aug. 11, 1948     5 Sheets-Sheet 5
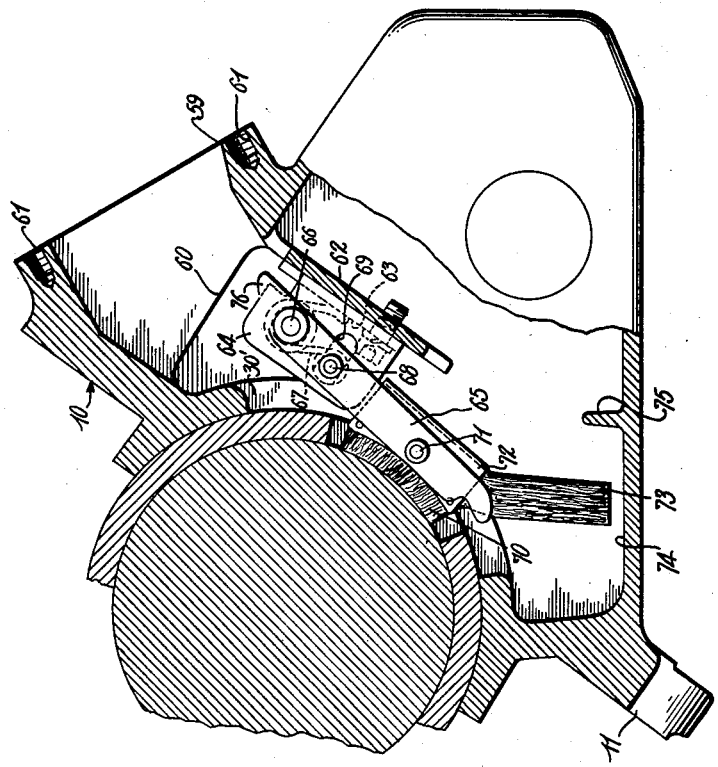
Inventor
R. J. Harkenrider Patented June 2, 1953

2,640,740

UNITED STATES PATENT OFFICE 2,640,740

JOURNAL LUBRICATOR

Robert J. Harkenrider, Winona, Minn., assignor to Gladys D. Miller, Winona, Minn.

Application August 11, 1948, Serial No. 43,579

7 Claims. (Cl. 308—132)

The invention relates to journal lubricators and is particularly adapted to the lubrication of the journals of electric motors, diesel engine bearings and the like.

It is an object of the invention to provide a lubricator, utilizing an oil sump, with felt wicks and applicators to supply oil to the journal through a window in the journal bearing.

A further object of the invention is to provide a lubricator of the type referred to which may be readily removed from the journal housing for assembly and repair.

It is a further object of the invention to provide a journal lubricator having felt lubrication applicators held in arms provided with springs to lightly press the applicators against the journal surface.

It is a further object of the invention to provide a lubricator mounted to provide an automatic change in the relation of the lubricator to the journal when the direction of rotation thereof reverses.

It is a further object of the invention to provide a lubricator, use of which will provide lower bearing temperatures than have been usual.

It is a further object of the invention to provide a lubricator made up of a plurality of pad elements each relatively narrow axially of the journal and mounted to provide a substantially uniform supply of lubricant along the lubricated areas.

It is a further object of the invention to provide a process of application of lubricant to a journal in ample supply and resulting in lowering the temperature of the bearing.

Further objects of the invention will appear from the following description when read in connection with the accompanying drawings showing illustrated embodiments of the invention and wherein:

Figure 3 is a front view on an enlarged scale of a spring for holding the applicator in contact with the surface of the journal;

Figure 5 is a section similar to Figure 2 of a different form of pad support;

Figure 6 is a plan view broken away showing the structure of the form of Figure 5;

Figures 7 and 8 are detail vertical transverse sections showing the change in relation of the pads to the journal in the two directions of rotation of the journal;

Figure 9 is a detail section on line 9—9 of Figure 6;

Figure 10 is a vertical transverse section of a form of the invention utilizing horizontal arms;

Figure 11 is a detail section showing pad holders spring-supported for parallel motion;

Figure 12 is a vertical section on line 12—12 of Figure 11, partly in elevation;

Figure 13 is a face view of a further form of lubricator of the invention removed from the journal; and Figure 14 is a section on line 14—14 of Figure 13 showing the lubricator and the journal.

Figure 1:
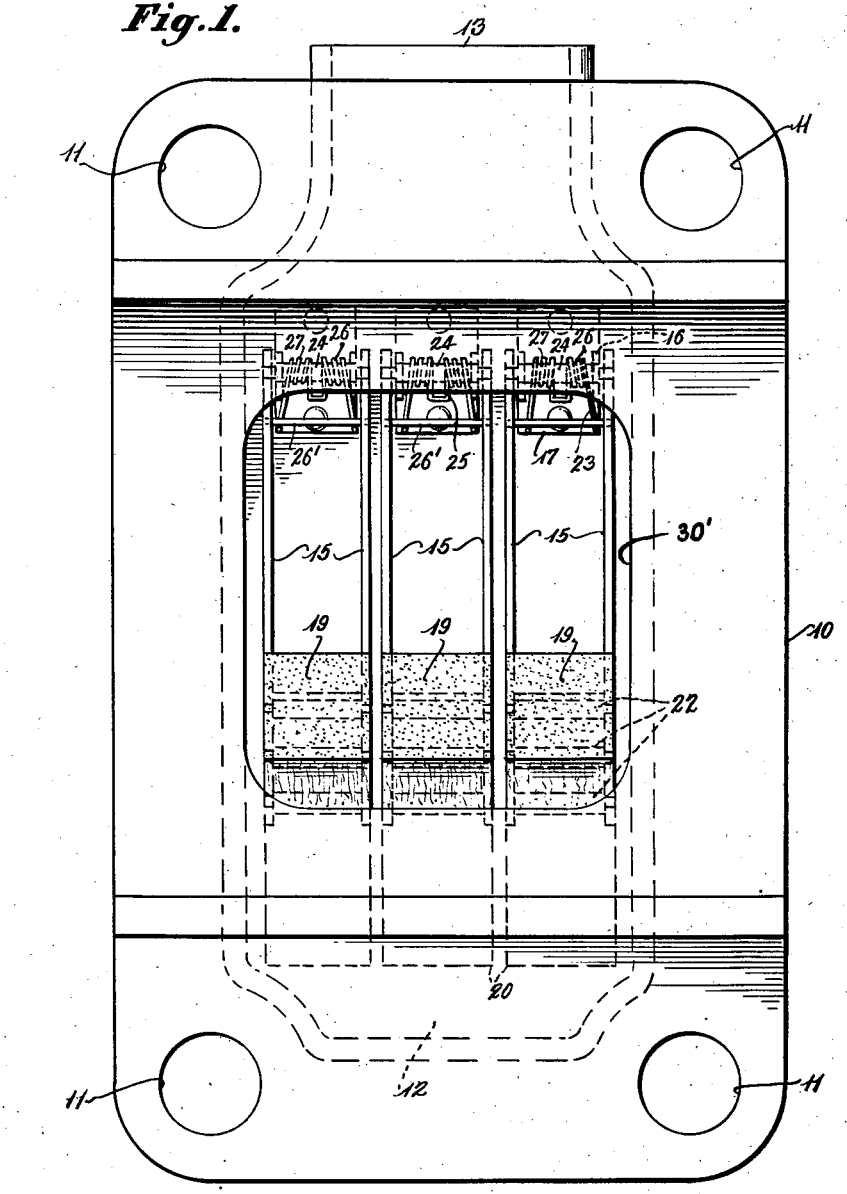
Figure 1 is a face view of a lubricator removed from the journal bearing.
Figure 2:
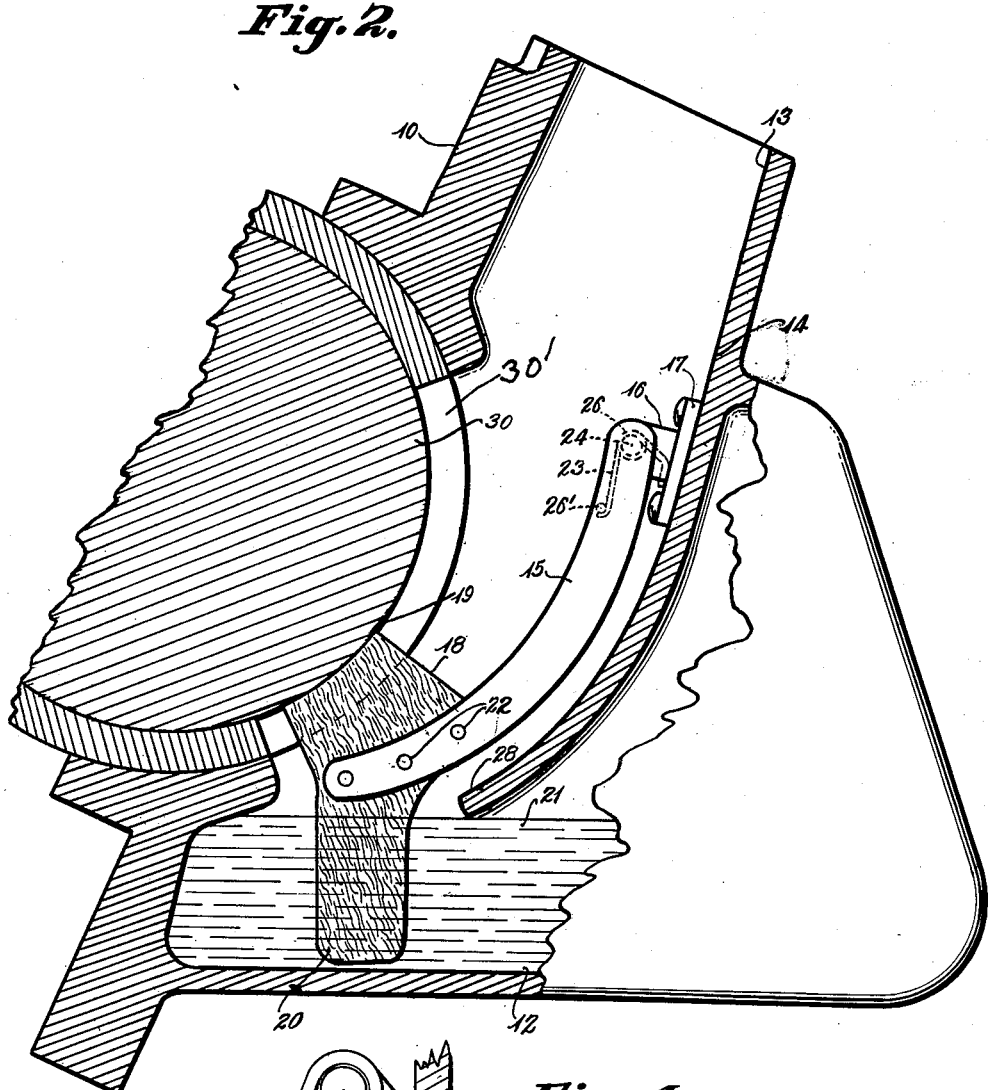
Figure 2 is a central vertical section of the structure of Figure 1 shown in place in relation to the journal.
Figure 4:
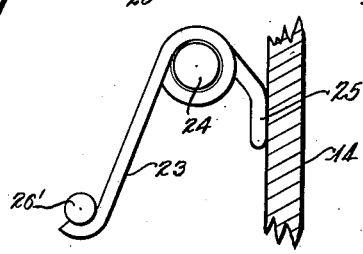
Figure 4 is a detail end view of the structure of Figure 3.

As shown, the device comprises a casing 10 formed with bolt openings 11 through which bolts may pass to secure the device to the journal bearing supports. To carry a supply of lubricant, oil sump 12 is shown, an opening 13 being provided into the lubricator for introduction of lubricant. Mounted upon the wall 14 of the casing 10 there are shown a plurality of arms 15 pivotally carried upon rods 24, mounted in lugs 16 projecting from plates 17 secured to the wall 14 as by means of rivets, bolts, cap screws, or the like. The plates 17 with the assembled arms 15 and pads 18 are conveniently secured to the wall 14 before the casing 10 is applied to the journal, at which time insertion of the securing devices may be made through the window 30'.

Between the lower ends of the arms 15, there are shown felt applicator bodies 18 presenting surfaces 19, the felt bodies 18 extending into wick members 20, dipping into a supply of lubricant as oil in the sump 12.

Desirably, the bodies 18 are produced from felt in such a manner that the surfaces 19 present largely the ends of fibers of felt. The bodies 18 are shown as secured between the arms 15 by means of pins 22. To move the arms 15 about their pivots to press the bodies 18 against the surface of the journal 30, there are shown coil springs 23 turned about the rods 24, which rods project through the arms 15 and, as stated, serve as pivots therefor. The portions 25 of the springs 23 project to react against the wall 14 of the casing, and the ends of the springs 23 react against rods 26' spanning the space between the arms 15. The portions 25 of the springs are extended portions of the two halves 26, 27 of the spring.

Between duplicate end portions of the spring 23 the portions 26, 27 are each independently anchored whereby in the event of breakage of one of the end portions connected with the rods 26', the remaining portion of that spring would still be operable to preserve contact of the applicator with the journal surface. The wall 14 is shown as extended down into the sump as at 28 to limit the splashing of the oil under movement of the vehicle and the lower portion of the sump 12 is sufficiently extended to carry an adequate supply of lubricant which will be effective until exhausted by action of the wick portion 20 of the felt bodies.

As shown in Figures 5, 6, and 9, the arms 15' are pivoted on the rods 24' mounted in ears 16' desirably pre-assembled on the plate 14' secured by cap screws 31 to the housing 13'. The spacing of the arms 15' is desirably preserved by spacing bushes 32, 33 surrounding the rods 24' and 34.

As shown the pads 35 are confined in rigid cases 36 which may be of metal, plastic or the like, and are pivotally mounted between the ends of arms 15'. From the cases the wick portions of the pads project to dip into the lubricant.

In the form of Figure 9 the cases flare at their upper margins. If the flare is not provided the cases are to be terminated short of the faces of the pads in order to permit the pads to "broom" out so as to leave no area of the journal without lubrication.

The cases 36 are an important feature of the invention. They serve to confine the pads to prevent spreading and/or swelling under spring pressure oil soaking and stresses of service. By thus confining the pads to a definite volume the density will remain constant, and they will always feed the same amount of lubricant.

The provision of the rigid cases enables the utilization of the bushings 80 which act as spacers for the arms 15' and provide rigid pivots for the pins 35' and for the pads. Without the cases and the rigid pivots the operation device could not be predetermined so as to be certain to be effective at predetermined speeds.

In the form of bushings, pins, and arms shown in Figure 9 the spreading of the arms and of the cases 36 is prevented. The expansion of the pads at the surface thus provides a continuous area of contact with the journal while reserving space for the ends of the arms 15'.

Forms of the invention are shown in Figures 10, 11, and 12 in which the pad assemblies are mounted on readily removable face plates.

As shown in Figure 10, the face plate 38 carries the projecting ears 39, between which the pad carrying arms 40 are pivoted, to be urged toward the journal by springs 41 pressing the arms 40 by stress applied on rods 42, as with rods 26 and 26'. In this form the pads 47 are encased in jackets 43 similar to the casings 36, secured therein by pins 44. The jackets 43 are formed with openings through which the wicks 45 project to dip into the lubricant.

A stop rod 46 is shown to prevent undue yield to springs 41 while the face plate 38 is being placed carrying the assembled lubricator. The pads 47 are desirably relatively narrow axially of the journal as shown in Figure 10, and the individual pads are shown as pivotally mounted on pivots 48.

To prevent excessive movement of the pads 47 and their jacket casings a pin 49 is shown extending between the arms 40 and through a recess 50 in each jacket 43.

In the form of Figures 11 and 12 the lubricator assembly is shown as mounted on a face plate 51 secured by cap screws 52. In this form vertical posts 53 are provided to guide the plate 54 in which plate the pads 55 are shown mounted on a pivot rod 56. The pads each carry wick members 45' as in the form of Figure 10. To press the pads toward the journal, springs 57 are shown. Excess movement of the plate 54 is prevented by stop pins 58 inserted through the upper ends of posts 53.

In the form of Figures 13 and 14, the casing 10 has a narrowed opening 59 the inner surface of which curves to the line 60, tapped recesses 61 being provided for securing a cover plate.

To carry the lubricator assembly a plate 62 is provided. Said assembly is shown as comprising a plate 63 carrying ears 64. To pivotally support the arms 65, a rod 66 is shown mounted in ears 64 and projecting therebeyond at each end. The arms 65 are thus carried outside of the ears.

To receive the spring stress of springs 67, a rod 68 is shown passing through slots 69 in the arms 65 and having its ends secured to the arms. Movement of the arms about pivot 66 is thus permitted by the slots 69.

A plurality of pads 70 are shown pivotally mounted side by side on a rod 71, each pad shown as encased in a metal jacket 72 and as having a wick 73 projecting to dip into lubricant in sump 74. A baffle 75 is shown to check surging of the lubricant.

To restrain the action of the springs 67 while the assembly is being secured in the housing 10, the arms are shown as projecting beyond the rod 66 as at 76, leaving a gap between said projections and plate 63. A bar-like member may be inserted in this gap to hold the arms 65 retracted during installation, to be pulled out through opening 59, as by an attached flexible member as a piece of light chain.

The lubricator assembly may be installed in the housing 10 through the window, before the housing is secured to the journal bearing, and the described restraining bar (not shown) will be of service not only during installation of the assembly in the housing, but also when the housing is bolted on. The arms 15' of Figures 5 and 6 are also shown with projecting ends 76' for the same purpose.

Experience has shown it to be substantially impossible to cut felt of sufficient thickness to provide an end of fiber surface of the size required for the present purpose. By using a plurality of pads as shown for instance in Figures 9, 13 and 14 the individual pads may be cut. Still they must be "skived" in sets of individuals to be sold and used together.

In producing an assembly such as shown in Figures 13 and 14 mounted on plate 63 there must be sufficient looseness of the parts to permit some relative motion about their pivots, between the various arms, to be certain that all pads will come to contact.

An important feature of the invention is the process of lubrication resulting from the pivotal mounting of the pads upon the spring-pressed arms, and diagrammatically illustrated by Figures 7 and 8. With the pads thus pivotally mounted, as on rods 35', 48, 56, or 71, rotation of the journal will cause slight movement about the pivot to cause the pads to move or tend to move into the positions shown in the Figures 7 and 8 depending on the direction of rotation of the journal.

The amount of this tilting movement of the pads will also depend upon the speed of rotation of the journal. For purpose of illustration the trailing edge of the pad at 77 is shown as actually spaced from the journal intentionally exaggerated as the result may be only a difference in pressure between the leading and trailing edges. The amount of this pressure differential or tilting may be predetermined for an expected journal speed, by the location of the pivotal axes of the pads with respect to the journal surface.

The result of this pressure differential or tilting is that the lubricant is pressed out of the fibers at the leading edges of the pads and squeezed toward the trailing edge, there being deposited on the journal a heavier film of lubricant than would otherwise result, as the journal surface leaves the pad. It is found that because of this greater thickness of film of lubricant a substantial lowering of bearing temperature results. As a consequence engines and motors so lubricated may be run hundreds of thousands of miles without servicing other than lubricant renewal.

Minor changes may be made in the physical embodiment of the invention within the scope of the appended claims without departing from the spirit of the invention.

I claim:

1. A journal lubricator comprising, in combination: a plurality of lubricant applicator pads each relatively narrow transversely parallel with the axis of a journal to be lubricated; a rigid jacket-casing enclosing each applicator at its side surfaces; wick means projecting from each pad and a bushing firmly attached to said jacket at pivot point; and means to resiliently press each pad toward a journal to be lubricated.

2. A journal lubricator comprising, in combination: a plurality of lubricant applicator pads each relatively narrow transversely, parallel with the axis of a journal to be lubricated; a rigid jacket-casing enclosing each pad at its side surfaces; a bushing passing through each pad and secured to the respective jacket-casing sides; wick means projecting from each pad, and means to resiliently press each pad toward a journal to be lubricated.

3. In a journal lubricator, a pair of arms pivoted adjacent to corresponding ends on a journal box, absorbent applicator means secured between said arms adjacent to the remaining ends thereof and formed with an applicator surface and with wick means depending therefrom, spring means urging the said arms to move about a pivot to hold said surface against a journal, the first-named ends of said arms projecting beyond the pivot and spaced from the journal box where the remaining ends of the arms are depressed to permit blocking means to be inserted in the space to restrain said spring means during the operation of installing the arms and the applicator in the journal box.

4. In a journal lubricator, a resilient carrier, an elongated lubricating pad having its sides confined laterally in a holder pivoted on the carrier and having one end projecting beyond the holder for contact with a journal to be lubricated and having its other end depending from the holder to form a wick for conducting lubricant from a supply.

5. In a journal lubricator, a resilient carrier, an elongated lubricating pad having its sides confined laterally in a holder pivoted on the carrier and having one end projecting beyond the holder for contact with a journal to be lubricated and having its other end depending from the holder to form a wick for conducting lubricant from a supply, and means limiting the pivotal movement of the holder and pads with respect to the carrier.

6. In a journal lubricator, a plurality of elongated lubricating pads side by side each having its sides confined in a pivoted holder and having one end projecting beyond the holder for contact with a journal and having its other end depending from the holder to form a wick, and resilient means urging the pads toward a journal.

7. In a journal lubricator, a plurality of elongated lubricating pads side by side each having its sides confined in a pivoted holder flared at one end and having one end projecting beyond the flared end of the holder for contact with a journal and having its other end depending from the holder to form a wick, and resilient means urging the pads toward the journal.

ROBERT J. HARKENRIDER.

References Cited in the file of this patent

UNITED STATES PATENTS

| Number | Name | Date |
|---|---|---|
| 334,013 | Gibbons | Jan. 12, 1886 |
| 424,350 | Phelps | Mar. 25, 1890 |
| 439,207 | Stever | Oct. 28, 1890 |
| 944,375 | Nichol | Dec. 28, 1909 |
| 2,095,257 | Kendall | Oct. 12, 1937 |
| 2,249,472 | Hanna | July 15, 1941 |
| 2,540,829 | Miller | Feb. 6, 1951 |